United States Patent [19]
Blomquist

[11] Patent Number: 5,636,470
[45] Date of Patent: *Jun. 10, 1997

[54] DEVICE FOR THE CONTROLLED DISPENSING OF PELLETS

[75] Inventor: Eric N. Blomquist, Phoenix, Ariz.

[73] Assignee: Farnam Companies, Inc., Phoenix, Ariz.

[*] Notice: The term of this patent shall not extend beyond the expiration date of Pat. No. 5,397,033.

[21] Appl. No.: 387,268

[22] Filed: Feb. 13, 1995

[51] Int. Cl.⁶ .................................................. A01K 25/00
[52] U.S. Cl. ......................... 43/131; 222/521; 222/549
[58] Field of Search ...................... 43/124, 131; 222/521, 222/185.1, 519, 549

[56] References Cited

U.S. PATENT DOCUMENTS

| | | |
|---|---|---|
| 2,750,707 | 6/1956 | Ekstedt ........................... 43/131 |
| 3,123,259 | 3/1964 | Musel et al. ..................... 222/521 |
| 3,407,967 | 10/1968 | Stull ................................ 222/521 |
| 3,772,820 | 11/1973 | Bond ............................... 43/131 |
| 4,208,829 | 6/1980 | Manning .......................... 43/131 |
| 4,646,949 | 3/1987 | Stull ................................ 222/521 |
| 5,397,033 | 3/1995 | Blomquist ....................... 43/131 |

*Primary Examiner*—Jeanne Elpel
*Attorney, Agent, or Firm*—Joseph H. Roediger

[57] ABSTRACT

A pellet dispenser wherein pellets are loaded into a cylindrical cap having a centrally-located tube. The tube contains a guide and a flange end. The dispenser includes a base having an inclined skirt bounded by an external flange with a post to be inserted into the tube. The post is provided with a circumferential shoulder and a guideway. Insertion of the post into the tube orients the cap and base and permits relative rotation. The assembled dispenser is inverted for use.

17 Claims, 2 Drawing Sheets

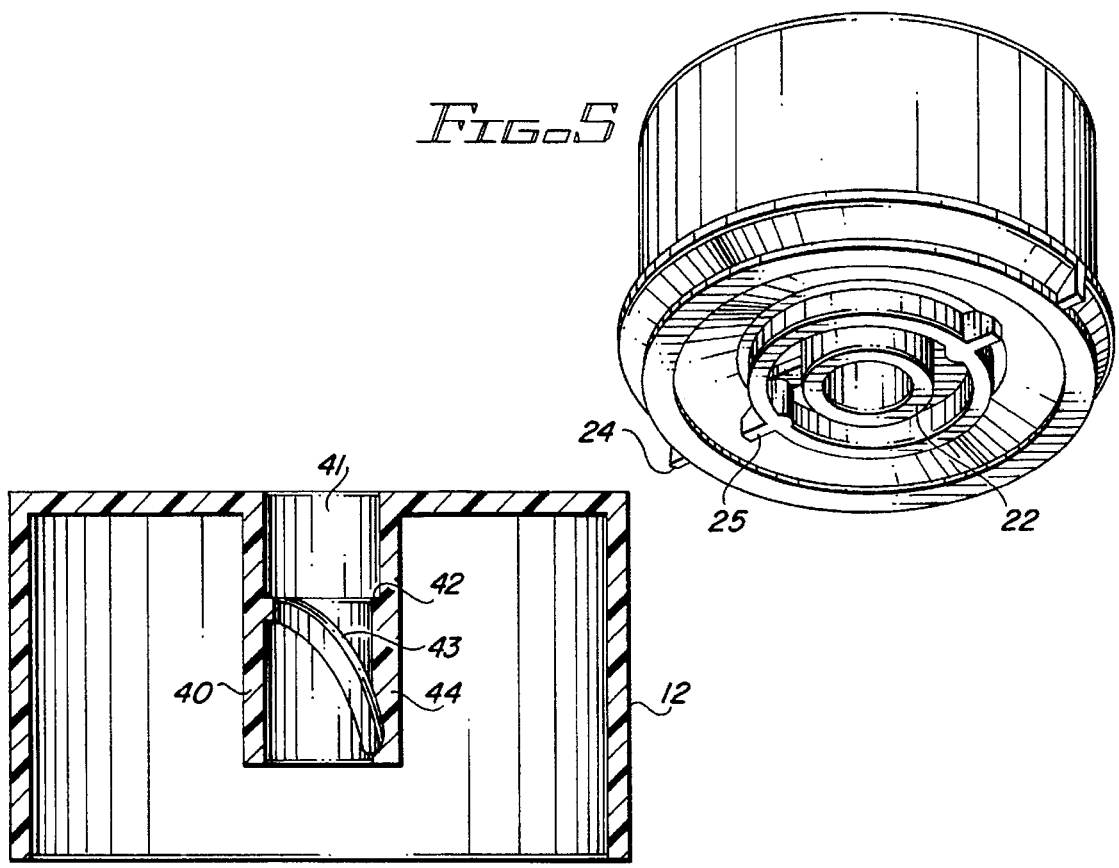
FIG. 5
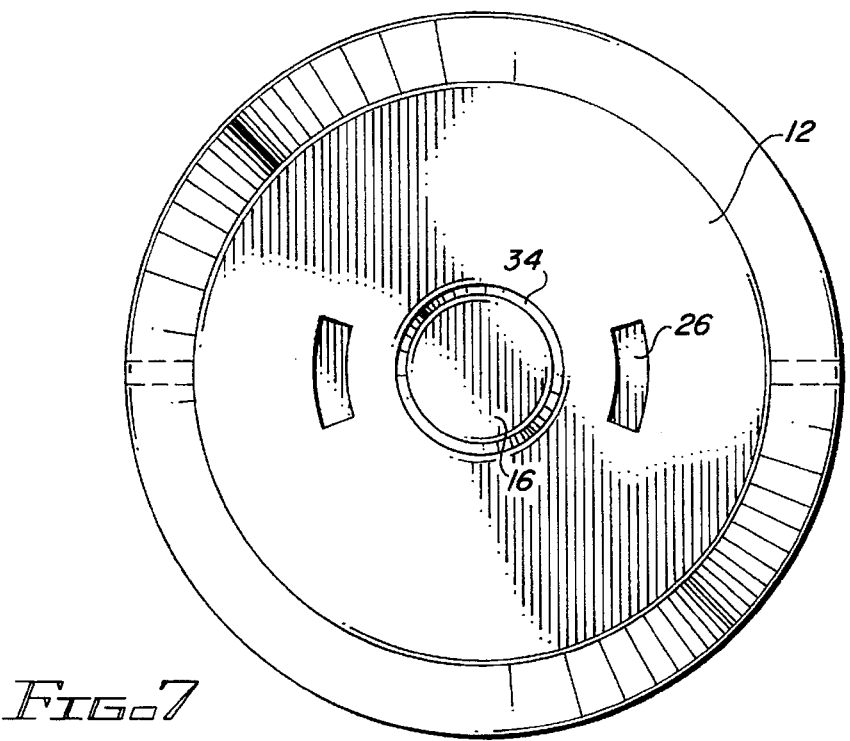
FIG. 6
FIG. 7

DEVICE FOR THE CONTROLLED DISPENSING OF PELLETS

BACKGROUND OF THE INVENTION

This invention relates to a device for the controlled dispensing of pellets and, in particular, to a dispenser for a pelletized rodenticide.

The ever-increasing awareness of the effects of toxic substances, both on individuals and on the surrounding environment, have created a demand for products using toxic materials in a controlled and confined manner. In the past, toxic substances in granular or pelletized form were scattered on the ground or placed on open containers to provide a measure of control of rats, mice and other vermin. The practice of scattering toxic substances is no longer acceptable and the use of open containers wherein the toxic substances might be available to small animals and children are in disfavor. Furthermore, the use of toxic substances in urban and suburban areas wherein the population density is relatively large is a matter of great concern.

The desire to control distribution of toxic substances has led to poison bait stations such as shown in U.S. Pat. No. 2,977,711 wherein a bait dish is provided with a separate cover containing apertures sized to exclude small animals. The use of a feeding dish requires that the users transfer the toxic substance from a larger container to the feeding dish thereby exposing both themselves and the environment to the substance. In addition, the placement of the cover is a temporary matter for the cover can be dislodged exposing the open dish to other animals. A combination dish and cover structure is shown in U.S. Pat. No. 2,710,485 wherein the cover is attached to the base structure. Apertures define passageways and control access with the toxic material being made available through inner openings. While the dispenser is still loaded by the user, the problem of dislodging the cover is eliminated. However, the handling and movement of this device creates an opportunity for spillage since the toxic substance is not fully confined during movement. A preloaded and sealed dispensing device is shown in U.S. Pat. No. 4,211,028 wherein the poison is contained in a chamber having a wall made of a consumable substance having a taste or odor attractive to rodents. The problems associated with the transfer of toxic substances to the device and the possibility of spillage occurring during initial placement of the device are eliminated by this particular structure. However, once the rodent has chewed through the containing wall, the poison tumbles out and is available to the rodent and to other animals. Furthermore, the poison bait is exposed to moisture in this type of device and to the marking activities of rodents which serve to discourage use by other rodents.

A different approach is taken in the dispensing apparatus shown in U.S. Pat. No. 4,746,033 wherein a vertical pipe serves as a reservoir for granular or pelletized toxic material. The device is augured into the ground with a container proximate to the bottom of the tube contacting the ground to serve as a catchment for contained material. A protective cover is slidably mounted on the tube and extends outwardly of the containers so that access can be denied to larger animals and it can be covered during nonoperating periods. The tube communicates with the lower container through one or more apertures and the granular material flows downwardly and outwardly into the container. The device is not preloaded so that the user must fill the tube from a larger storage container. The device is intended to be used in agricultural fields which enables it to be inserted into the ground.

Accordingly, the present invention is directed to the provision of an improved device for the controlled dispensing of toxic substances wherein the device can be preloaded by the addition of pellets to an inverted cap followed by the urging of the base into engagement with the cap. In addition, the device is constructed to enable it to be readily opened by the user to a defined open position without spillage of the contents. The defined opening exposes the toxic bait about the peripheral region of the device to provide a 360° access to the bait. In addition, the present invention limits the availability of the toxic substance to feeding vermin by controlled dispensing about the peripheral region thereby reducing the likelihood of materials flowing outwardly of the device. Thus, the user need not handle the toxic substance and the opportunity for unintentionally scattering the material on the ground, either during use of during movement to another site, is essentially eliminated.

The subject invention is formed of two parts each of which is well suited for injection molding to provide a low cost of manufacture. The parts are provided with a guide and mating guideway for relative rotation and vertical movement. Also, an internal stop is provided to define the full open position of the dispenser. The relative movement between the two parts controls the amount of material available as well as establishing the size of the opening through which the vermin may feed. The opening extends around the device to provide access to the bait therein. An alignment rib is provided in the device to facilitate assembly and to direct the placement of the guide in the guideway for the subsequent opening of the dispenser prepatory to use thereof.

SUMMARY OF THE INVENTION

The present invention is directed to apparatus for the controlled dispensing of stored toxic pelletized materials, typically a rodenticide pellet, which comprises a two part assembly including base structure and a cap movably mounted thereon. The base structure includes an inclined skirt upon which the pellets are supported, and a peripheral flange joined to the skirt with the flange extending upwardly and outwardly from the skirt. A post is centrally mounted on the base structure and includes a guide for controlling vertical movement of the cap. The post is provided with a flange located about the edge of its upper end and a vertical rib projecting therefrom.

The cap is dimensioned to contact the juncture of the skirt and flange when the apparatus is in the closed position and the toxic material is contained therein. The cap also includes a centrally located tube having a stop on its inner wall for limiting the vertical movement of the cap and defining the full open position of the dispenser. The flange on the post contacts the stop when the cap is rotated to full-open. By limiting the movement of the cap away from the skirt and flange juncture, the movement of pellets contained within the cap along the skirt to rest against the flange is controlled. Pellets adjacent the flange are accessible to rodents when the cap is in an open position. However, by limiting the vertical movement of the cap, the pellets do not overflow the peripheral flange and are contained within the device.

In a preferred embodiment, the peripheral flange forms an oblique angle with the skirt. The skirt has a downward slope to assist in the movement of the toxic material from under the cap toward the flange. The flange confines the material and it is those pellets proximate to the flange that are available to the feeding rodent. The cap tube is threadedly engaged on the post and the stop is located therein to limit relative movement between cap and base structure and define the full-open position.

In the manufacture of the present invention, the parts are well suited for injection molding to provide a low cost of manufacture. The assembly steps include the placement of the cap in an inverted position followed by the insertion of the toxic material into the cap. While in this inverted position, the base structure is then urged downwardly thereon so that the flange on the post is deflected by the inner wall of the tube until the stop is passed. At that point, the flange assumes the normal extended position so that the cap cannot be removed from the base. In the final position, the juncture between skirt and flange of the base structure contacts the bottom edge of the cap. Normally, a groove is provided at the juncture to receive and firmly seat the cap therein. The inner wall of the tube contains a guideway which engages a guide on the post. Also, a vertical stop is located on the tube inner wall for contacting the vertical rib on the post when the device is fully closed. The guideway and vertical stop cooperate with the vertical rib to align the cap and base structure during assembly. Alignment therebetween is also aided by the provision of alignment means such as indexing tabs or slots on the exterior surfaces of the cap and base structure. After the forceful insertion of the post into the tube on the inverted and filled cap, the device is ready for packaging and shipment. The provision of a readily assembled and preloaded rodenticide dispenser is a primary objective of the present invention.

Further features and advantages of the invention will become more readily apparent from the following detailed description thereof when taken in conjunction with the accompanying drawings.

BRIEF DESCRIPTION OF THE DRAWINGS

FIG. 5 is a perspective view of the embodiment of FIG. 1 showing the alignment tabs.

FIG. 6 is a cross-section view of the cap of the embodiment of FIG. 1.

FIG. 7 is a top view of the embodiment of FIG. 1.

DESCRIPTION OF THE PREFERRED EMBODIMENT

Figure 1:
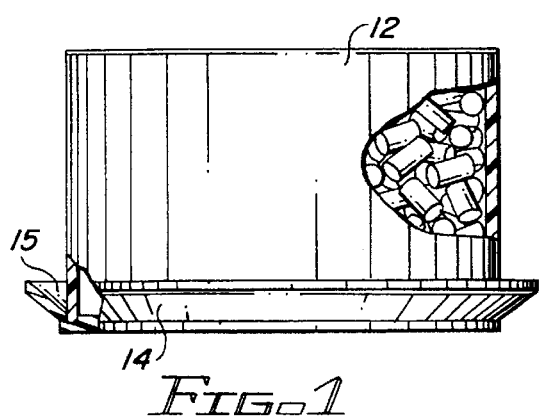
FIG. 1 is a side view of one embodiment of the invention in a closed position.

Referring now to FIG. 1, the present invention is shown in preferred form which includes a cap 12 fitted in contact with base structure 14. The cap is dimensioned to fit against the base at the bottom of flange 15. A centrally-located post 16 is provided with a circumferential sealing flange 34 which contacts the adjacent portion of the cap. In FIG. 1, the device is shown in the closed position with the toxic material in pelletized form contained within the device. While the embodiment described contains pellets, it should be noted that other shapes or forms of solid toxicants can be used if desired.

Figure 2:
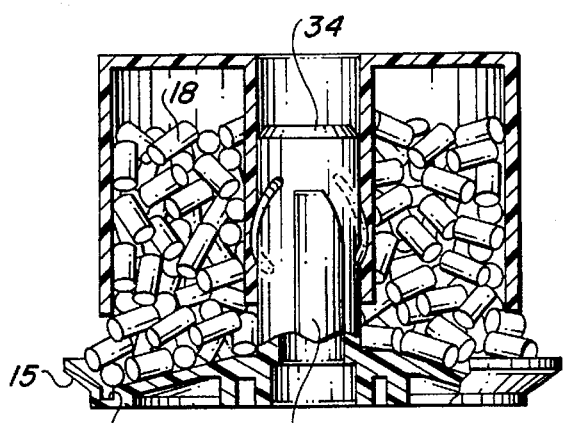
FIG. 2 is a cross sectional view of the embodiment of FIG. 1.

The cross sectional view of FIG. 2 shows the device filled with rodenticide pellets 18. The side wall of cap 12 extends downwardly to the base of flange 15 and, in the closed position, rests in circumferential groove 36. The groove provides a seal to prevent any of the toxic material contained in the device from migrating outwardly from the base structure during shipment and handling. The rodenticide pellets are friable and may self-abrade during movement thereby creating a powder which tends to fall to the bottom of the device. Since the contained materials are toxic, any leakage of material is highly undesirable even when the device is packaged. The post 16 is provided with a sealing flange 34 which inhibits loss of material through the central opening of cap 12. Thus, the pellets and any generated powder are confined until the device is placed in operation.

As shown in FIG. 2, the cap 12 threadedly engages post 16 for helical movement in relation to the base to the open position. The structure of base 14 is seen more clearly in FIG. 3 wherein the central post 16 is shown with vertical ribs 31 projecting from its side surface. The post extends from a central platform 21. The platform is horizontal and is connected to a skirt 20 which extends outwardly and downwardly therefrom terminating in circumferential groove 36. As mentioned previously, groove 36 receives the bottom edge of the cap 12 when the device is in the closed position. The guide 38 on post 16 travels within a mating guideway 43 formed on thickened wall portion 44 of the inner wall 40 of tube 41 in the cap. Guideway 43 begins at an edge of the wall portion 44 and terminates at its upper end with the circumferential shoulder 42. Each guide 38 formed on the post 16 moves within a corresponding guideway to control the helical movement of the cap in relation to the base structure. The upward rotation of the cap is limited by the contacting of the shoulder 42 by flange 34 which together form a stop to define the full-open position. The closed position wherein the cap 12 enters the groove 36 is established by the opposing vertical ribs 31 on post 16 contacting the thickened wall portion 44 of the tube beneath the shoulder as seen in FIG. 6. The wall portion 44 serves as a vertical stop projecting inwardly. In the closed position, the stop prevents rotational forces from causing the guides 38 to be driven out of the respective guideways when force is misapplied to the device. The vertical ribs 31 on the post 16 also serve to register to cap and base structure during assembly.

The opening of the embodiment of FIG. 1 to provide access to the rodenticide pellets contained therein is shown in FIG. 2. In order to open the device, cap 12 is rotated in relation to the base structure 14 thereby causing the guides to move along the guideways. As the cap rises above the base structure, a circumferential opening is provided therebetween to establish a 360° feeding opportunity for rodents. The pelletized material 18 contained in the cap is fed by the force of gravity downwardly and outwardly along the inclined skirt 20. The outermost pellets rest against the flange 15 and none of the bait contacts the ground. The vermin can feed on the exposed material without entering the device thereby reducing the opportunity for contamination or marking of the bait by the vermin. As material is consumed, the pellets continue to move downwardly and outwardly to continuously provide a toxicant supply until the material in the cap is consumed. The limiting of the full-open position prevents the pellets from flowing out of the trough formed by the flange 15 and the adjacent skirt 20. In the preferred embodiment, the limit of vertical movement of cap 12 is preferably set to prevent the cap from moving more than the thickness of the pellet above the edge of flange 15. As a result, the outward flow of pellets can be prevented. In use, the device is mounted on a surface and removably affixed by an adhesive pad which may be affixed to the bottom of the support member 22.

Figure 4:
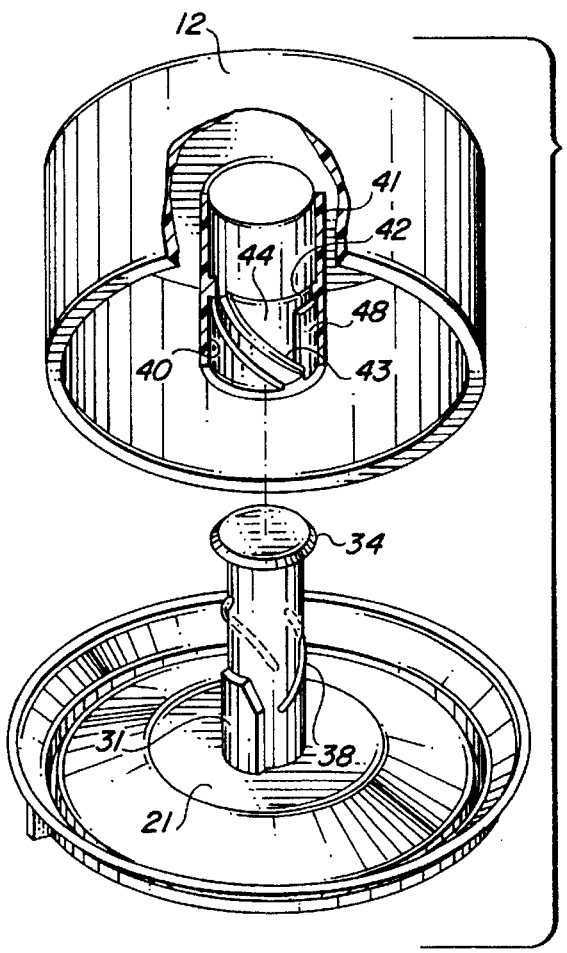
FIG. 4 is a perspective view partially cut-away of the embodiment of FIG. 1.
Figure 3:
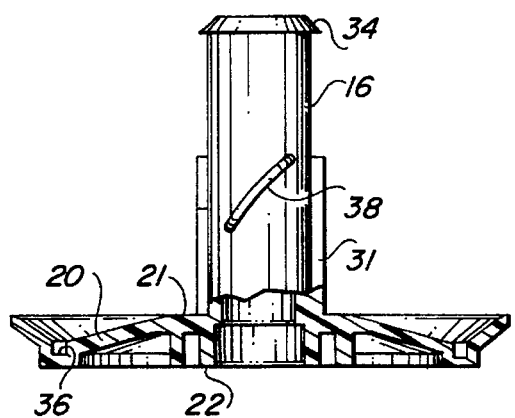
FIG. 3 is a partial cross sectional view of the base structure of the embodiment of FIG. 1.

During assembly, the molded cap is inverted and the pellets are added. The cap and base structure are made of thin walled flexible plastic so that the post 16 and flange 34 combination can be urged through the tube to the point where the guide 38 enters the guideway 43 and the sealing flange 34 emerges at the opening in the top of the cap. To provide the rotational alignment between cap and base structure, the alignment tabs 24 and 25 are molded on the bottom of the base structure as shown in FIG. 5. Also, alignment sockets 26 are formed in the top of the cap as seen in FIG. 7. The alignment tabs and sockets are located on the device in accordance with the assembly apparatus used to urge the base structure into the inverted cap. Also, the vertical ribs 31 projecting from the opposing sides of post 16 contact the thickened wall portion containing the guideway 43 in cases of misalignment during assembly. As seen in FIGS. 2, 3 and 4, the vertical ribs 31 have a chamfer at one corner. The chamfer is provided to aid in registration of cap 12 and base 14 during assembly by imparting a slight rotation should the end of the thickened wall 44 contact the chamfer. During operation, the opposing side of vertical rib 31 contacts the thickened wall portion 44 containing the guideway 43 to define the open position. The angled guideways deflect the ribs into the alignment position without damage to the assembled device. The guideways 43 are formed in a thickened wall portion of the tube 41 so that the lowermost section of the guideway terminates at the vertical stop established by wall portion 44 which locates and defines the full closed position of the device. The thickened wall portion 44 is shown in FIG. 4 as extending on each side of guideway 43 and terminating at the recess 48 defining the inner wall thickness.

As shown in FIGS. 3 and 5, the center post 16 and the central platform 21 are reinforced by the circular support member 22 extending downwardly from the platform. The central platform 21 is orthogonal to the post 16 and the inclined skirt 20 extends to terminate at groove 36. The flange 15 extends outwardly from the skirt, preferably at an angle greater than 90°, to serve as a retaining wall for the pellets. By limited the vertical movement of the cap to a position which is less than the thickness of the stored material above the edge of the flange, spillage is avoided during normal use. The rotation of the cap in the reverse direction allows the device to be closed if vermin control at this location is to be suspended. The device can be transported to another location without fear of spillage of the contents of the cap. Since residual material is likely to reside outside the cap, care must be taken to prevent it from being spilled during placement at another location.

While the above description has referred to a specific embodiment of the invention, it is to be noted that variations and modifications may be made therein without departing from the scope of the invention as claimed.

I claim:

1. A device for the controlled dispensing of pellets which includes a cap member movably mounted on a base structure between open and closed positions, said device comprising:
   a) a base structure having an upper surface for facilitating the distribution of stored pellets, said upper surface including a downwardly inclined skirt and a peripheral base flange joined to the skirt, said base flange extending upwardly from the skirt;
   b) a post having a free end and a fixed end centrally mounted on the base structure, said post having a first guide located between said ends;
   c) a first vertical rib projecting from the post and extending upwardly from the fixed end;
   d) a post flange provided at the free end of the post;
   e) a cap for confining the pellets, said cap being dimensioned to contact the juncture of the skirt and the base flange when the device is in the closed position, said cap having a downwardly extending tube for receiving the post therein, said tube having a shoulder therein to engage the post flange and define the open position of the device;
   f) a first guideway formed in said tube for receiving the first guide on said post and controlling relative movement of the cap and the base structure; and
   g) a vertical stop formed in said tube for contacting the first vertical rib when the device is in the closed position.

2. The invention in accordance with claim 1 wherein the shoulder in said tube comprises a circumferential shoulder extending around the inner wall of said tube.

3. The invention in accordance with claim 2 wherein said post flange at the free end of the post is downwardly tapered, said free end and post flange having a diameter greater than the diameter of the circumferential shoulder in said tube.

4. The invention in accordance with claim 3 wherein the circumferential shoulder is located approximately midway between the ends of said tube.

5. The invention in accordance with claim 4 further comprising an inner wall projection in said tube, said projection extending vertically from the end of the tube to the shoulder for contacting the vertical rib when the device is in the closed position.

6. The invention in accordance with claim 5 further comprising first and second alignment means located on the cap and base structure respectively, said alignment means providing alignment of the post in the tube during assembly.

7. The invention in accordance with claim 6 further comprising a second guide and a second vertical rib formed on said post, the first and second guides being located in diametric opposition.

8. The invention in accordance with claim 7 further comprising a second guideway formed on the inner wall of the tube, the first and second guides being located in diametric opposition.

9. In a device for the controlled dispensing of pellets which includes a base structure having a centrally-located post and a cap movably mounted thereon, the rotation of the cap between open and closed positions providing access to contained pellets, the improvement comprising:
   a) a first guide located on the post;
   b) a tube formed in the cap and having an inner wall and a free end, said tube being dimensioned to receive the post therein;
   c) a flange located at the top of the post;
   d) a guideway formed on the inner wall of said tube for controlling the relative rotation of the cap and the base structure;
   e) an alignment rib projecting from said post and extending upwardly from the base structure, the alignment rib being guided by the guideway during insertion of the post into the tube to cause the first guide to enter the guideway and thereby permit relative rotation of the cap and base structure.

10. The invention in accordance with claim 9 further comprising a shoulder formed on the inner wall of the tube, said shoulder engaging the flange on the post to define the open position of said device.

11. The invention in accordance with claim 10 further comprising an inner wall projection in said tube, said projection extending vertically from the free end of the tube for engaging the alignment rib when the device is in the closed position.

12. The invention in accordance with claim 11 further comprising first and second alignment means located on the cap and base structure respectively, said alignment means providing alignment of the post in the tube during assembly.

13. The invention in accordance with claim 11 wherein said shoulder is a circumferential shoulder formed on the inner wall of the tube.

14. The invention in accordance with claim 13 wherein said shoulder is located at the approximate mid-point of said tube.

15. The invention in accordance with claim 14 wherein the diameter of the flange on the post is greater than the internal diameter of the circumferential shoulder on the inner wall of the tube.

16. The invention in accordance with claim 14 further comprising a second guide and a second alignment rib formed on said post, the first and second guides being located in diametric opposition.

17. The invention in accordance with claim 16 further comprising a second guideway formed on the inner wall of the tube, the first and second guideways being located in diametric opposition.

\* \* \* \* \*